US010373324B2

(12) United States Patent
Ohi

(10) Patent No.: US 10,373,324 B2
(45) Date of Patent: Aug. 6, 2019

(54) MEASUREMENT APPARATUS THAT SCANS ORIGINAL, METHOD OF CONTROLLING THE SAME, AND STORAGE MEDIUM

(71) Applicant: CANON KABUSHIKI KAISHA, Tokyo (JP)

(72) Inventor: Akinori Ohi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 15/408,675

(22) Filed: Jan. 18, 2017

(65) Prior Publication Data

US 2017/0213353 A1   Jul. 27, 2017

(30) Foreign Application Priority Data

Jan. 22, 2016 (JP) ................................. 2016-010603

(51) Int. Cl.
*G06T 7/521* (2017.01)
*G01B 11/24* (2006.01)
*H04N 1/00* (2006.01)
*G01B 11/25* (2006.01)

(52) U.S. Cl.
CPC .............. *G06T 7/521* (2017.01); *G01B 11/24* (2013.01); *G01B 11/25* (2013.01); *H04N 1/00267* (2013.01); *H04N 1/00708* (2013.01); *H04N 1/00726* (2013.01); *H04N 1/00827* (2013.01); *G06T 2207/10028* (2013.01); *H04N 2201/0081* (2013.01); *H04N 2201/0084* (2013.01)

(58) Field of Classification Search
CPC ...... G06T 7/521; G01B 11/24; H04N 1/00267
USPC ......................................................... 348/136
See application file for complete search history.

(56) References Cited

U.S. PATENT DOCUMENTS 6,930,704 B1\* 8/2005 Hamada ............... H04N 13/254
348/42
9,014,433 B2   4/2015 Kobayashi et al.
2009/0185157 A1\* 7/2009 Imamura ............... G01C 3/085
356/3.01

(Continued)

FOREIGN PATENT DOCUMENTS

JP   2013036983 A   2/2013
JP   2015087244 A   5/2015

(Continued)

OTHER PUBLICATIONS

Extended European Search Report issued in European Appln. No. 17152145.3 dated May 31, 2017.

*Primary Examiner* — Jeffery A Williams
(74) *Attorney, Agent, or Firm* — Rossi, Kimms & McDowell LLP

(57) ABSTRACT

A measurement apparatus that is capable of positively generating a projection pattern suitable for a to-be-read object. A camera scanner as the measurement apparatus projects a projection pattern formed by a plurality of projection lines on a to-be-read object to thereby measure the bending of the to-be-read object. A distance to the to-be-read object is measured, and distance distribution information of the to-be-read object for identifying a shape, a size, and a position of the to-be-read object is generated based on the measured distance. The projection pattern is generated based on the generated distance distribution information of the to-be-read object.

7 Claims, 14 Drawing Sheets

(56) References Cited

U.S. PATENT DOCUMENTS

2013/0329942 A1 12/2013 Sonoda et al.
2017/0070635 A1 3/2017 Takahashi et al.

FOREIGN PATENT DOCUMENTS

| JP | 2015108602 A | * | 6/2015 |
| JP | 2015108602 A | | 6/2015 |
| WO | 2015167020 A1 | | 11/2015 |

* cited by examiner

601

602

604
603

605

607
606

609
608

610

611

612

613

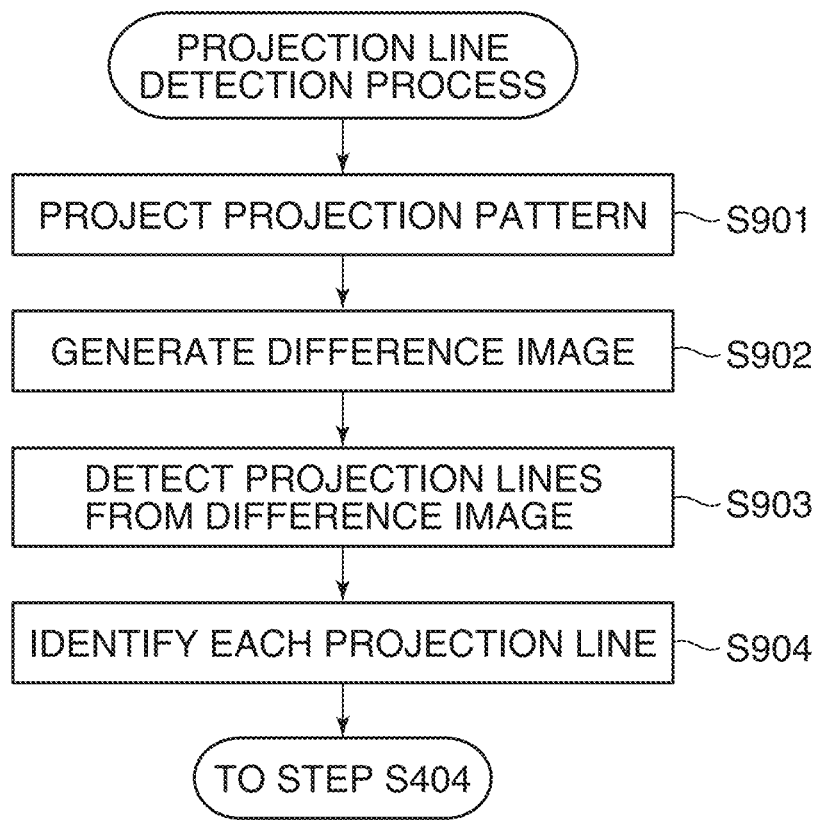

US 10,373,324 B2

MEASUREMENT APPARATUS THAT SCANS ORIGINAL, METHOD OF CONTROLLING THE SAME, AND STORAGE MEDIUM

BACKGROUND OF THE INVENTION

Field of the Invention

The present invention relates to a measurement apparatus, a method of controlling the same, and a storage medium, and more particularly to a measurement apparatus that scans an original from a position apart from the original, a method of controlling the same, and a storage medium.

Description of the Related Art

There has been known a camera scanner as a measurement apparatus that performs scan processing for scanning a to-be-read object placed e.g. on a desk from a position apart from the to-be-read object. The camera scanner is capable of performing processing for scanning a three-dimensional object, such as a document or a book, as a to-be-read object. In general, the camera scanner is assumed to perform processing for scanning a three-dimensional object, and hence the camera scanner is not equipped with a platen or the like for flattening an original. Therefore, in using the camera scanner, there is a case where scan processing is performed on an original in a bent state. In this case, image data with distortion may be generated due to the bending of the original. In recent years, there has been proposed a technique for measuring the bending of an original with high accuracy using e.g. a light sectioning method, and correcting the distortion caused by the bending of the original based on a result of the measurement. For example, in the light sectioning method, to measure the bending of an original, the camera scanner projects a projection pattern formed by a plurality of projection lines on an original from a projector provided in the camera scanner, and detects the projected projection pattern by using e.g. a camera provided in the same. The camera scanner calculates distance information of each projection line from the detected projection pattern by using a triangulation method, and measures the bending of the original based on the calculated distance information of each projection line. Further, in the light sectioning method, the camera scanner stores shape information indicative of the size and shape of an original and position information indicative of a position where the original is placed, in advance, and generates a projection pattern suitable for the original, based on the stored shape information and position information (see e.g. Japanese Patent Laid-Open Publication No. 2013-36983).

However, in the technique disclosed in Japanese Patent Laid-Open Publication No. 2013-36983, unless the shape information and position information of an original have been stored in advance, it is impossible to generate a projection pattern suitable for the original.

SUMMARY OF THE INVENTION

The prevent invention provides a measurement apparatus that is capable of positively generating a projection pattern suitable for a to-be-read object, a method of controlling the same, and a storage medium.

In a first aspect of the invention, there is provided a measurement apparatus that projects a projection pattern formed by a plurality of projection lines on a to-be-read object to thereby measure bending of the to-be-read object, comprising a distance measurement unit configured to measure a distance to the to-be-read object, a distance distribution information-generating unit configured to generate distance distribution information of the to-be-read object for identifying a shape, a size, and a position of the to-be-read object, based on the measured distance, and a projection pattern-generating unit configured to generate the projection pattern based on the generated distance distribution information of the to-be-read object.

In a second aspect of the invention, there is provided a method of controlling a measurement apparatus that projects a projection pattern formed by a plurality of projection lines on a to-be-read object to thereby measure bending of the to-be-read object, comprising measuring a distance to the to-be-read object, generating distance distribution information of the to-be-read object for identifying a shape, a size, and a position of the to-be-read object, based on the measured distance, and generating the projection pattern based on the generated distance distribution information of the to-be-read object.

In a third aspect of the invention, there is provided a non-transitory computer-readable storage medium storing a computer-executable program for executing a method of controlling a measurement apparatus that projects a projection pattern formed by a plurality of projection lines on a to-be-read object to thereby measure bending of the to-be-read object, wherein the method comprises measuring a distance to the to-be-read object, generating distance distribution information of the to-be-read object for identifying a shape, a size, and a position of the to-be-read object, based on the measured distance, and generating the projection pattern based on the generated distance distribution information of the to-be-read object.

According to the present invention, it is possible to positively generate a projection pattern suitable for a to-be-read object.

Further features of the present invention will become apparent from the following description of exemplary embodiments (with reference to the attached drawings).

BRIEF DESCRIPTION OF THE DRAWINGS

FIGS. 8A to 8D are diagrams useful in explaining the projection pattern-generating process in FIG. 7, in which FIG. 8A shows a range of a projection pattern, FIG. 8B shows a projection line, FIG. 8C shows a predicted position range of the projection line, and FIG. 8D shows an example of the projection pattern.

FIG. 9 is a flowchart of a projection line detection process performed in a step in FIG. 4.

FIGS. 10A to 10C are diagrams useful in explaining a problem to be solved by a first variation of the embodiment, in which FIG. 10A shows an original placed on an original placing table, FIGS. 10B and 10C each show an example of a projection pattern to be projected.

FIGS. 12A to 12C are diagrams useful in explaining dividing lines generated by the process in FIG. 11, in which FIG. 12A shows an original area, and FIGS. 12B and 12C each show an example of the dividing lines.

DESCRIPTION OF THE EMBODIMENTS

The present invention will now be described in detail below with reference to the accompanying drawings showing embodiments thereof.

Although in the present embodiment, a description will be given of a case where the present invention is applied to a camera scanner as a measurement apparatus, the present invention is not limitedly applied to the camera scanner. For example, the present invention can be applied to any other measurement apparatus insofar as it is a measurement apparatus, such as a stand-type scanner, that is capable of performing processing for scanning a to-be-read object from a position apart from the to-be-read object.

Figure 1A:
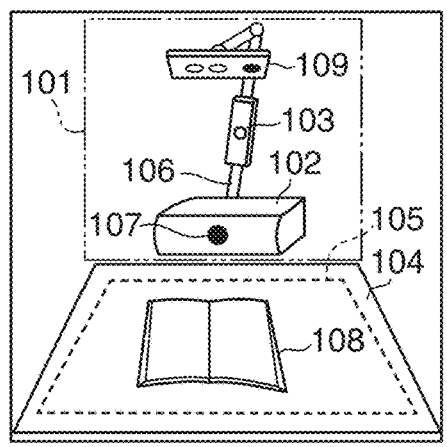
FIG. 1A is a schematic diagram of a camera scanner as a measurement apparatus according to an embodiment of the present invention.
Figure 1B:
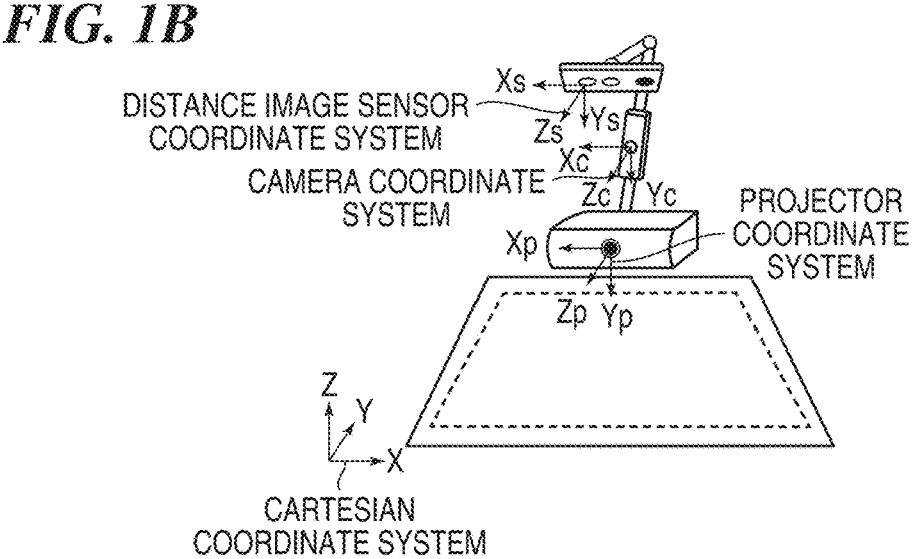
FIG. 1B is a diagram useful in explaining each of coordinate systems in the camera scanner shown in FIG. 1A.
Figure 1C:
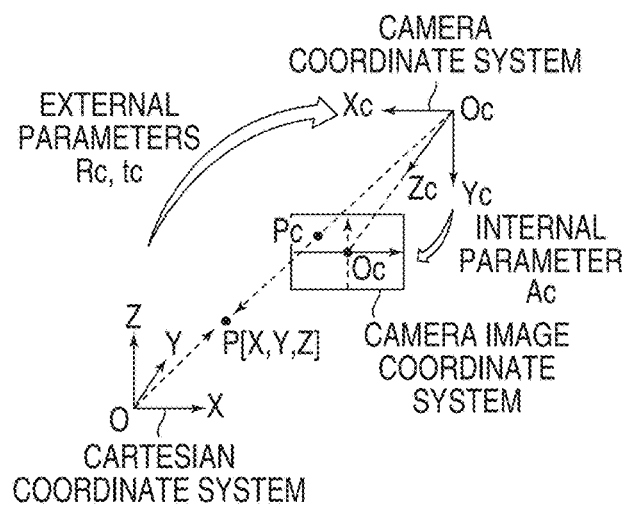
FIG. 1C is a diagram useful in explaining transformation between the coordinate systems shown in FIG. 1B.

FIGS. 1A to 1C are diagrams useful in explaining a camera scanner 101 as the measurement apparatus according to the embodiment, in which FIG. 1A is a schematic diagram of the camera scanner 101, FIG. 1B is a diagram useful in explaining coordinate systems, and FIG. 1C is a diagram useful in explaining transformation between the coordinate systems. Note that the orientation of each component in FIGS. 1B and 1C does not represent an actuality, but illustration of each component is mainly intended to show the existence thereof.

Referring to FIG. 1A, the camera scanner 101 includes a controller 102, a camera unit 103, an arm portion 106, a projector 107, and a distance image sensor unit 109 (distance measurement unit). The controller 102, the camera unit 103, the projector 107, and the distance image sensor unit 109 are connected by the arm portion 106.

The controller 102 controls the camera unit 103 as a main unit of the camera scanner 101, the projector 107, and the distance image sensor unit 109. The camera unit 103 photographs an area which is set in advance in a direction in which the camera unit 103 is oriented, such as an area 105 including part of an original placing table 104, such as a desk. The camera unit 103 is capable of setting either a high resolution or a low resolution. The arm portion 106 can be bent and extended by joints. The projector 107 projects a projection pattern for measuring the bending of an original 108 which is a to-be-read object on the original 108. The distance image sensor unit 109 is a distance image sensor based on a pattern projection method using an infrared ray. The distance image sensor unit 109 photographs an area set in advance in a direction in which the distance image sensor unit 109 is oriented, such as the area 105 including the original 108, to thereby measure the distance to the original 108. In the present embodiment, when the camera scanner 101 measures the bending of the original 108, the camera unit 103 and the distance image sensor unit 109 are pointed to a reading surface of the original 108.

In the camera scanner 101, as shown in FIG. 1B, a camera coordinate system, a projector coordinate system, and a distance image sensor coordinate system associated with the camera unit 103, the projector 107, and the distance image sensor unit 109, respectively, are defined. The camera coordinate system is a coordinate system based on the camera unit 103, and in the camera coordinate system, a horizontal component and a vertical component of an image plane photographed by the camera unit 103 are defined as $X_c$ and $Y_c$ with reference to an origin $o^c$, and a component orthogonal to the image plane is defined as $Z_c$ with reference to the origin $o^c$. The projector coordinate system is a coordinate system based on the projector 107, and in the projector coordinate system, a horizontal component and a vertical component of a projection image plane projected by the projector 107 are defined as $X_p$ and $Y_p$, respectively, and a component orthogonal to the projection image plane is defined as $Z_p$. The distance image sensor coordinate system is a coordinate system based on the distance image sensor unit 109, and in the distance image sensor coordinate system, a horizontal component and a vertical component of an image plane photographed by the distance image sensor unit 109 are defined as $X_s$ and $Y_s$, respectively, and a component orthogonal to the image plane is defined as $Z_s$. Further, in the camera scanner 101, not only the camera coordinate system, the projector coordinate system, and the distance image sensor coordinate system, but also a Cartesian coordinate system which is a coordinate system based on the original placing table 104 is defined. In the Cartesian coordinate system, a horizontal component and a vertical component of a plane of the original placing table 104 are defined as X and Y, respectively, and a component orthogonal to the plane of the original placing table 104 is defined as Z. Each coordinate system can be transformed to another using a calculation expression. For example, the camera scanner 101 can transform a three-dimensional point P [X, Y, Z] of the Cartesian coordinate system to a three-dimensional point $P_c$ [$X_c$, $Y_c$, $Z_c$] of the camera coordinate system using a 3×3 rotation matrix $R_c$ and a translation vector $t_c$ by the following equation (1) (see e.g. FIG. 1C):

$$[X_c, Y_c, Z_c]^T = [R_c | t_c][X, Y, Z, 1]^T \quad (1)$$

Hereinafter, the rotation matrix $R_c$ and the translation vector $t_c$ are defined as external parameters of the camera unit 103.

Further, as shown in FIG. 1C, the camera scanner 101 can transform the three-dimensional point $P_c$ [$X_c$, $Y_c$, $Z_c$] of the camera coordinate system to the three-dimensional point P [X, Y, Z] of the Cartesian coordinate system by the following equation (2):

$$[X, Y, Z]^T = [R_c^{-1} | -R_c^{-1} t_c][X_c, Y_c, Z_c, 1]^T \quad (2)$$

Further, the camera scanner 101 can perform projection transformation from the three-dimensional point $P_c$ [$X_c$, $Y_c$, $Z_c$] of the camera coordinate system to a two-dimensional point $p_c$ [$x_c$, $y_c$] of a camera image coordinate system using a 3×3 matrix $A_c$ expressed e.g. by a focal length and the center of the image, by the following equation (3):

$$\lambda[x_c, y_c, 1]^T = A_c[X_c, Y_c, Z_c]^T \quad (3)$$

Hereafter, the matrix $A_c$ is defined as an internal parameter of the camera unit 103:

Although in the present embodiment, the description is given of a case where projection transformation is performed by using the equation (3) assuming that the lens has no distortion for convenience of explanation, projection transformation may be performed using a parameter taking distortion of the lens into consideration.

Similarly, the camera scanner 101 can transform the three-dimensional point P [X, Y, Z] of the Cartesian coordinate system to a three-dimensional point $P_p$ [$X_p$, $Y_p$, $Z_p$] of the projector coordinate system using a 3×3 rotational matrix $R_p$ and a translation vector $t_p$, by the following equation (4):

$$[X_p, Y_p, Z_p]^T = [R_p | t_p][X, Y, Z, 1]^T \quad (4)$$

Hereafter, the rotation matrix $R_p$ and the translation vector $t_p$ are defined as external parameters of the projector 107.

Further, the camera scanner 101 can transform the three-dimensional point $P_p$ [$X_p$, $Y_p$, $Z_p$] of the projector coordinate system to the three-dimensional point P [X, Y, Z] of the Cartesian coordinate system by the following equation (5):

$$[X, Y, Z]^T = [R_p^{-1} | -R_p^{-1} t_p][X_p, Y_p, Z_p, 1]^T \quad (5)$$

Further, the camera scanner 101 can perform projection transformation from the three-dimensional point $P_p$ [$X_p$, $Y_p$, $Z_p$] of the projector coordinate system to a two-dimensional point $p_p$ [$x_p$, $y_p$] of the projector coordinate system using a 3×3 matrix $A_p$ expressed e.g. by a focal length and the center of the image, by the following equation (6):

$$\lambda[x_p, y_p, 1]^T = A_p[X_p, Y_p, Z_p]^T \quad (6)$$

Hereinafter, the matrix $A_p$ is defined as an internal parameter of the projector 107.

Note that the above-mentioned internal parameters and external parameters are used assuming that calibration has been performed in advance.

Figure 2:
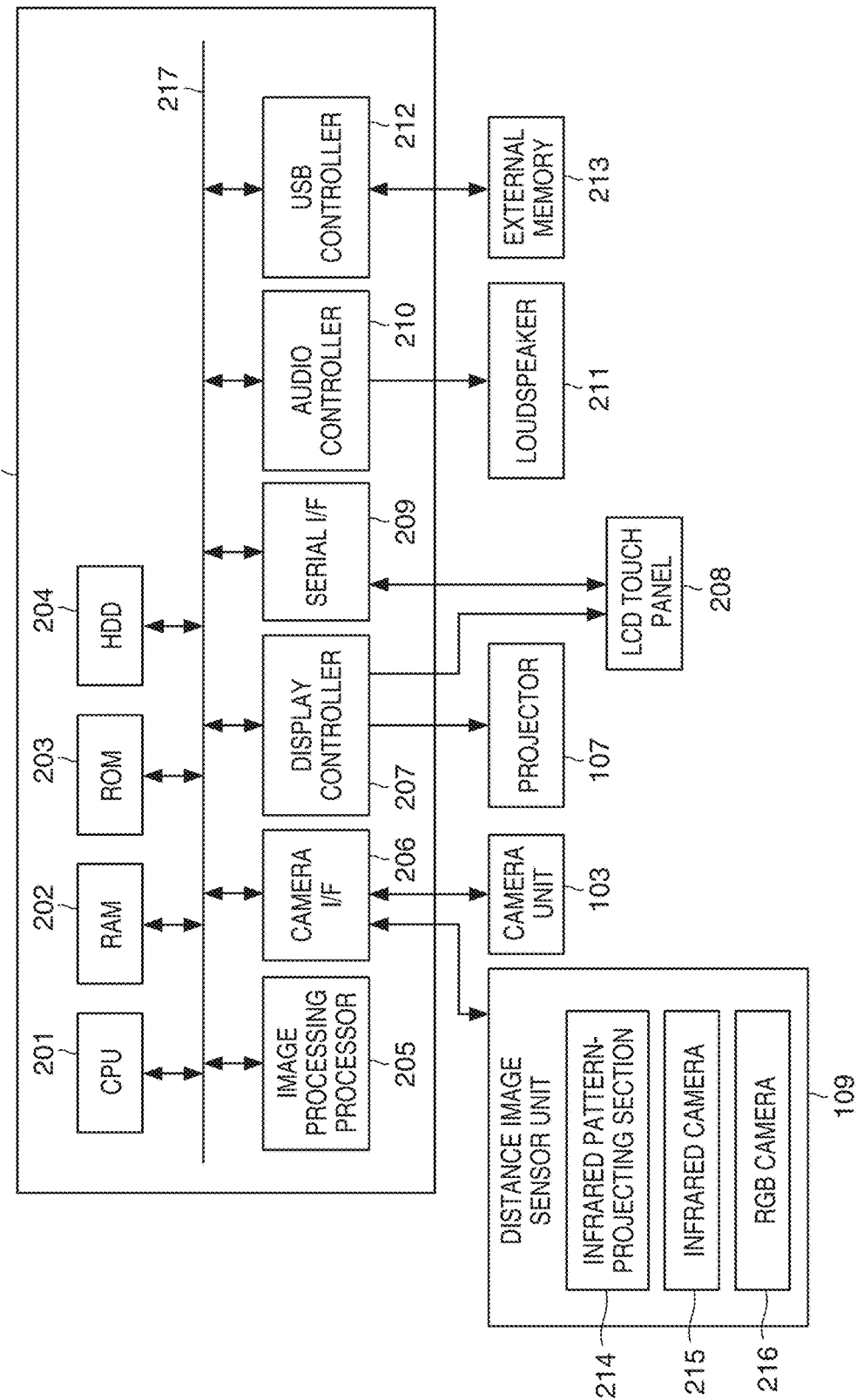
FIG. 2 is a schematic block diagram showing a hardware configuration of the camera scanner.

FIG. 2 is a schematic block diagram showing a hardware configuration of the camera scanner 101 shown in FIG. 1A.

Referring to FIG. 2, the camera scanner 101 includes not only the controller 102, the camera unit 103, the projector 107, and the distance image sensor unit 109, appearing in FIG. 1A, but also an LCD touch panel 208, a loudspeaker 211, and an external memory 213. The controller 102 includes a CPU 201, a RAM 202, a ROM 203, an HDD 204, an image processing processor 205, a camera interface 206, a display controller 207, a serial interface 209, an audio controller 210, and a USB controller 212. The CPU 201, the RAM 202, the ROM 203, the HDD 204, the image processing processor 205, the camera interface 206, the display controller 207, the serial interface 209, the audio controller 210, and the USB controller 212 are interconnected to each other via a system bus 217. The distance image sensor unit 109 includes an infrared pattern-projecting section 214, an infrared camera 215, and an RGB camera 216.

The CPU 201 controls the overall operation of the controller 102, and performs processing operations of software 300, described hereinafter with reference to FIG. 3, by executing programs stored in the ROM 203. The RAM 202 is a volatile memory, and is used as a work area for the CPU 201 and an area for temporarily storing data. The ROM 203 is a nonvolatile memory storing programs executed by the CPU 201. The HDD 204 is a hard disk drive having a larger capacity than the RAM 202, and stores programs, information on settings, and so forth. The image processing processor 205 reads out image data stored in the RAM 202, performs image processing, such as rotation, scaling, and color conversion, on the read image data, and writes back the image data subjected to image processing into the RAM 202. The camera interface 206 performs data communication with each of the camera unit 103 and the distance image sensor unit 109. For example, the camera interface 206 acquires image data and distance image data from the camera unit 103 and the distance image sensor unit 109, respectively, according to instructions from the CPU 201, and writes the acquired image data and distance image data into the RAM 202. Further, the camera interface 206 delivers control commands from the CPU 201 to the camera unit 103 and the distance image sensor unit 109 so as to make settings for the camera unit 103 and the distance image sensor unit 109. The display controller 207 performs data communication with the projector 107 and the LCD touch panel 208, the serial interface 209 performs data communication with the LCD touch panel 208, and the audio controller 210 performs data communication with the loudspeaker 211. The USB controller 212 performs data communication with the external memory 213. The infrared pattern-projecting section 214 projects a projection pattern of an invisible infrared ray on a to-be-read object. The infrared camera 215 is a camera that photographs a projection pattern projected on a to-be-read object. The RGB camera 216 is a camera that photographs visible light by converting the visible light into RGB signals. The LCD touch panel 208 displays e.g. a setting screen for making settings for the camera scanner 101. The loudspeaker 211 outputs sound based on an analog audio signal received from the audio controller 210. The external memory 213 is a USB memory, a SD card or the like.

Figure 3:
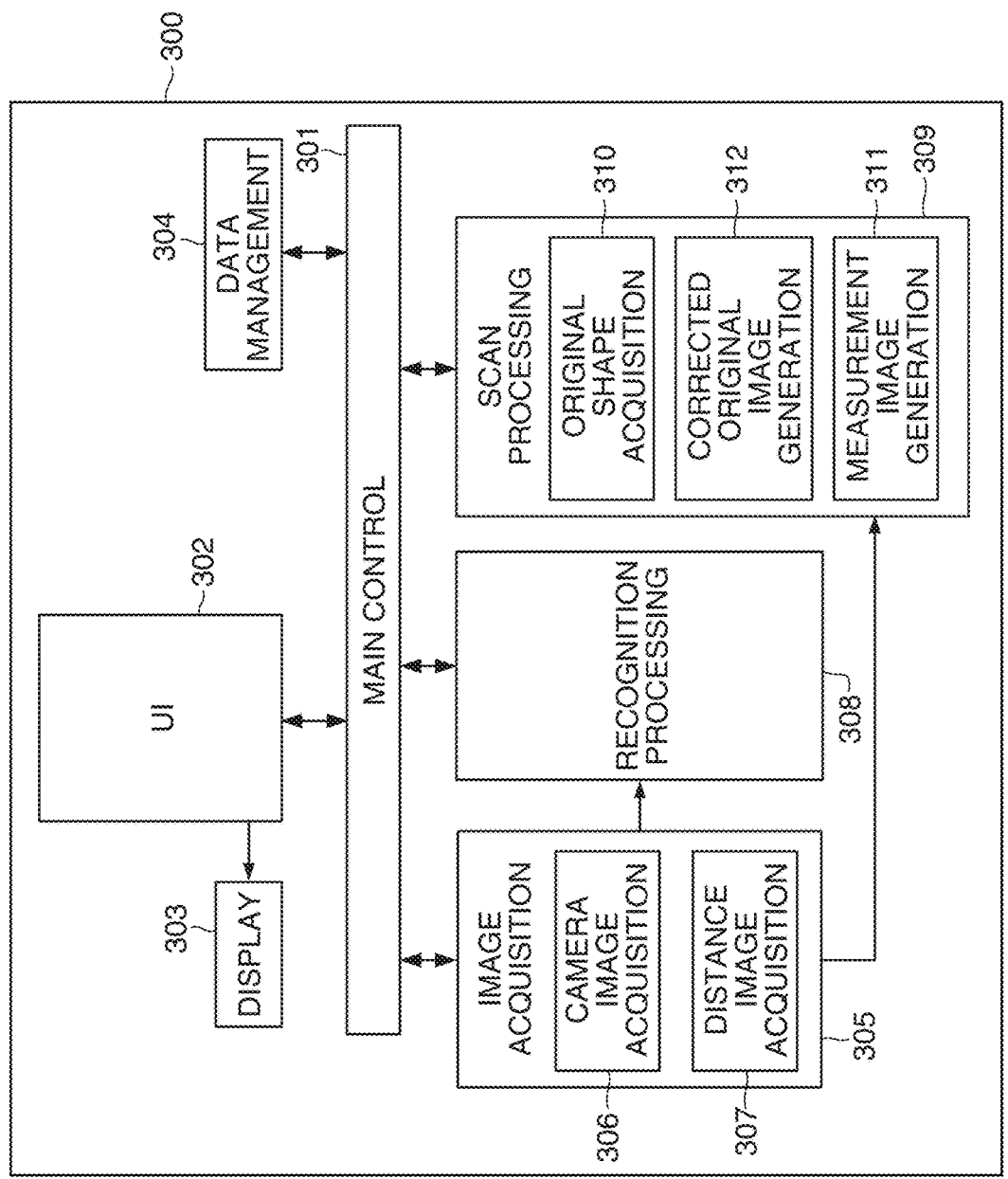
FIG. 3 is a schematic block diagram showing a software configuration of the camera scanner.

FIG. 3 is a schematic block diagram showing a configuration of the software 300 of the camera scanner 101 shown in FIG. 1A. Note that FIG. 3 illustrates each module by omitting the term "module".

Referring to FIG. 3, the software 300 includes a main control module 301, a UI module 302, a display module 303, a data management module 304, an image acquisition module 305, a recognition processing module 308, and a scan processing module 309. The image acquisition module 305 includes a camera image acquisition module 306 and a distance image acquisition module 307, and the scan processing module 309 includes an original shape acquisition module 310, a measurement image generation module 311, and a corrected original image generation module 312. The processing operations of the software 300 are performed by the CPU 201 that executes the programs stored in the ROM 203.

The main control module 301 controls the UI module 302, the data management module 304, the image acquisition module 305, the recognition processing module 308, and the scan processing module 309. The UI module 302 controls data communication concerning user interface. For example, the UI module 302 generates GUI data, such as a message to be displayed e.g. on the LCD touch panel 208 and operation buttons, and sends an instruction for displaying the GUI data to the display module 303. Further, the UI module 302 receives a user's operation performed on the LCD touch panel 208, which is detected by the recognition processing module 308. The display module 303 controls the display controller 207 to display the GUI data on the LCD touch panel 208 and the like. The data management module 304 manages each data used by the camera scanner 101, and controls processing for storing the data. The image acquisition module 305 performs image input processing.

The camera image acquisition module 306 acquires image data from the camera unit 103 via the camera interface 206. The acquired image data is stored in the RAM 202. The distance image acquisition module 307 acquires distance image data from the distance image sensor unit 109 via the camera interface 206. The acquired distance image data is stored in the RAM 202. The recognition processing module 308 recognizes the movement of an object on the original placing table 104 based on the acquired image data and distance image data. For example, the recognition processing module 308 acquires image data including GUI data from the image acquisition module 305, and when the recognition processing module 308 detects a touch or the like (gesture) of the GUI data, the recognition processing module 308 notifies the main control module 301 of the detection result. Further, upon receipt of a notification of object placement waiting processing or object removal waiting processing from the main control module 301, the recognition processing module 308 acquires image data of a photographed image of the original placing table 104, from the image acquisition module 305. Based on the acquired image data, the recognition processing module 308 detects a timing in which the movement of an object placed on the original placing table 104 is stopped, and a timing in which the object is removed from the original placing table 104. The scan processing module 309 performs processing for scanning an original. The original shape acquisition module 310 acquires shape information including the shape, size, and position of the original 108, based on distance distribution information 610, described hereinafter with reference to FIG. 6G. The measurement image generation module 311 generates a projection pattern for measuring the bending of an original placed on the original placing table 104. The corrected original image generation module 312 generates image data in which distortion cause by the bending of an original is corrected, based on the shape information acquired by the original shape acquisition module 310.

Figure 4:
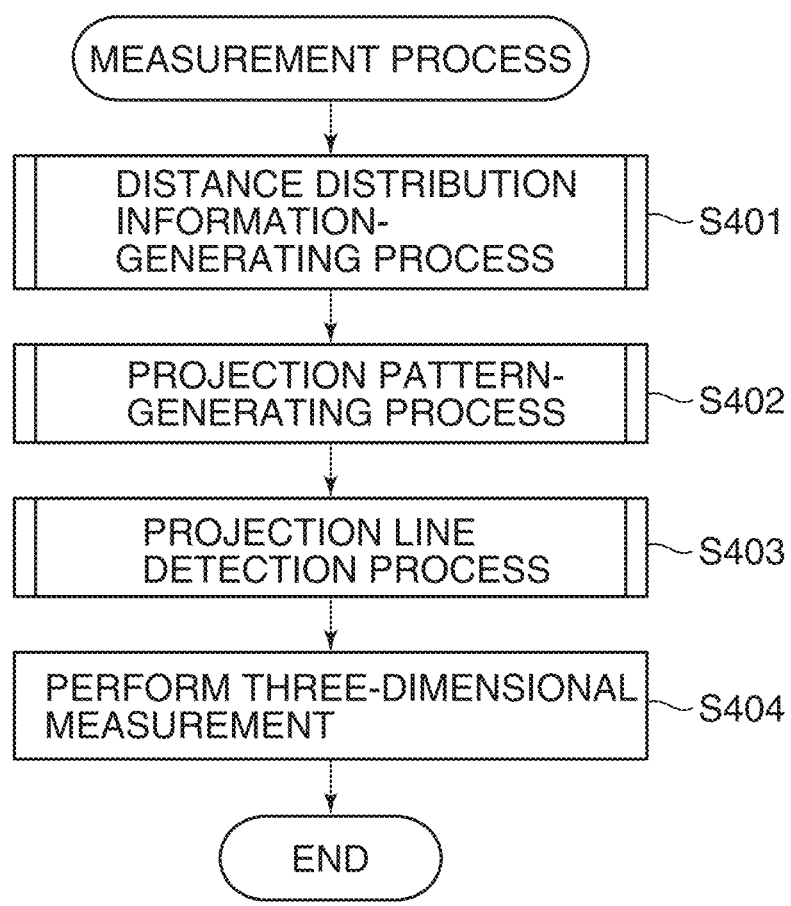
FIG. 4 is a flowchart of a measurement process performed by the camera scanner.

FIG. 4 is a flowchart of a measurement process performed by the camera scanner 101 shown in FIG. 1A.

The measurement process in FIG. 4 is performed by the CPU 201 executing the programs stored in the ROM 203.

Referring to FIG. 4, first, the CPU 201 performs a distance distribution information-generating process, described hereinafter with reference to FIG. 5 (step S401), to generate, based on measured distances, the distance distribution information 610, described hereinafter with reference to FIG. 6G, for generating a projection pattern. Then, the CPU 201 performs a projection pattern-generating process, described hereinafter with reference to FIG. 7 (step S402), to generate a projection pattern to be projected on the original 108 based on the distance distribution information 610 generated in the step S401. Then, the CPU 201 performs a projection line detection process, described hereinafter with reference to FIG. 9 (step S403), to detect the projection pattern projected on the original 108. Then, the CPU 201 performs three-dimensional measurement with high accuracy, based on the projection pattern detected in the step S403, using a light sectioning method and a triangulation method, and measures the bending of the original 108 based on a result of the three-dimensional measurement (step S404), followed by terminating the present process.

Figure 5:
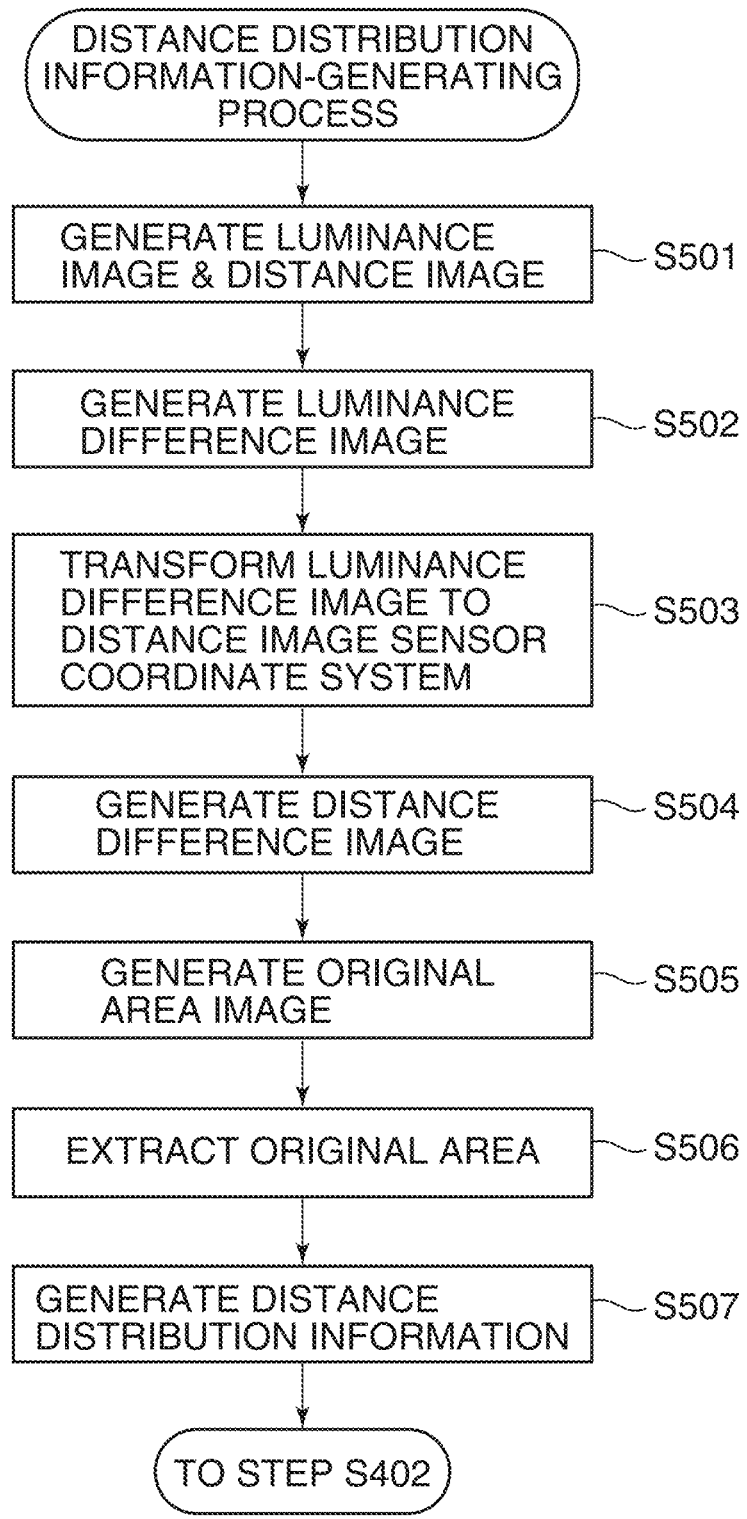
FIG. 5 is a flowchart of a distance distribution information-generating process performed in a step in FIG. 4.

FIG. 5 is a flowchart of the distance distribution information-generating process performed in the step S401 in FIG. 4.

Figure 6A:
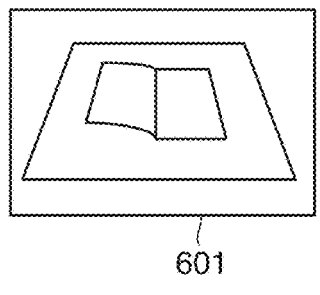
FIGS. 6A to 6J are diagrams each showing an example of data used in the distance distribution information-generating process in FIG. 5.
Figure 6B:
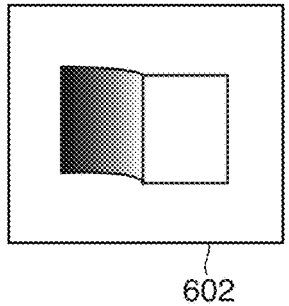
Figure 6C:
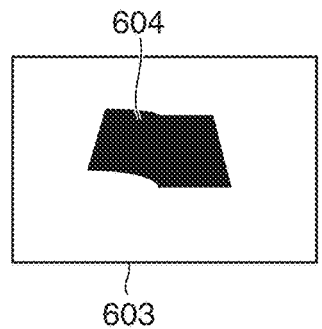

Referring to FIG. 5, first, the CPU 201 causes the camera unit 103 to photograph the original 108 to thereby generate a luminance image 601 shown in FIG. 6A, including luminance information. Further, the CPU 201 causes the distance image sensor unit 109 to photograph the original 108 to thereby generate a distance image 602 shown in FIG. 6B, including distance information (step S501). Note that in the present embodiment, a background luminance image and a background distance image, which are generated by photographing the original placing table 104 on which the original 108 is not placed, from the same angle, have been stored in the RAM 202 before executing the step S501. In the distance image 602 generated in the step S501, a to-be-read object is indicated in white if a distance from the distance image sensor unit 109 is equal to a distance between the original placing table 104 and the distance image sensor unit 109, and is indicated darker as the distance between the to-be-read object and the distance image sensor unit 109 is smaller. In the present embodiment, it is assumed, by way of example, that one luminance image 601 and one distance image 602 are generated, but the number of luminance images and the number of distance images are each not limited to one. For example, to improve the accuracy of measurement of the distance information, a plurality of luminance images and a plurality of distance images may be generated in the step S501. Then, the CPU 201 generates a luminance difference image 603 shown in FIG. 6C based on a difference between the background luminance image stored in the RAM 202 in advance and the luminance image 601 (step S502). In the luminance difference image 603, only an area 604 in which there is a difference in luminance between the background luminance image and the luminance image 601 is indicated in black.

Figure 6D:
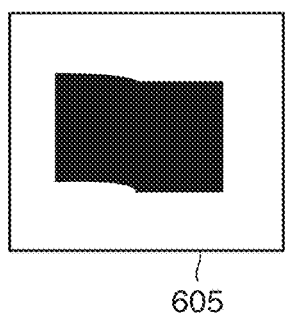
Figure 6E:
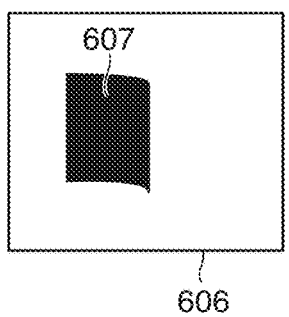
Figure 6F:
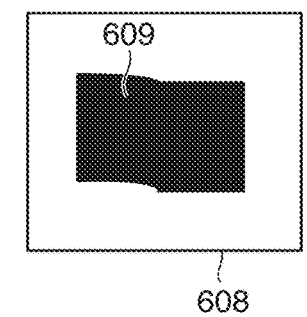
Figure 6G:
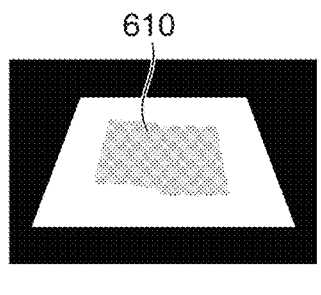

Then, the CPU 201 transforms the luminance difference image 603 from the camera coordinate system to the distance image sensor coordinate system (step S503). As a result, a luminance difference image 605 based on the distance image sensor unit 109, which is shown in FIG. 6D, is generated. Then, the CPU 201 calculates a difference between the background distance image stored in the RAM 202 in advance and the distance image 602, and generates a distance difference image 606 binarized based on the calculation result, which is shown in FIG. 6E (step S504). In the distance difference image 606, an area 607 in which the difference between the background distance image and the distance image 602 is larger than a predetermined threshold value is indicated in black, and an area, other than the area 607, in which the difference between the background distance image and the distance image 602 is not larger than the predetermined threshold value is indicated in white. Here, in a case where the original 108 and the original placing table 104 have similar colors, a difference in luminance between the original 108 and the original placing table 104 is small, and hence it is sometimes difficult to identify the area of the original 108 from the luminance difference image 605 corresponding to the difference in luminance between the original 108 and the original placing table 104. Further, in a case where the original 108 is thin in thickness, the distance between the original 108 and the original placing table 104 is small, and hence it is sometimes difficult to identify the area of the original 108 from the distance difference image 606 corresponding to the difference in distance between the original 108 and the original placing table 104. To cope with this, in the present embodiment, after executing the step S504, the CPU 201 generates an original area image 608 shown in FIG. 6F by combining the luminance difference image 605 and the distance difference image 606 (step S505). This enables the CPU 201 to positively identify the area of the original 108 from the original area image 608. Then, the CPU 201 extracts an original area 609 from the original area image 608 (step S506), and stores distance distribution information including distance information of each of portions forming the extracted original area 609 in the RAM 202. Then, the CPU 201 transforms the distance distribution information of the original area 609 from the distance sensor coordinate system to the Cartesian coordinate system to thereby generate distance distribution information 610 with reference to the original placing table 104, which is shown in FIG. 6G (step S507). In the present embodiment, the CPU 201 identifies the shape, size and position of the original 108 using the distance distribution information 610. Then, the CPU 201 performs the projection pattern-generating process in the step S402 in FIG. 4.

Figure 7:
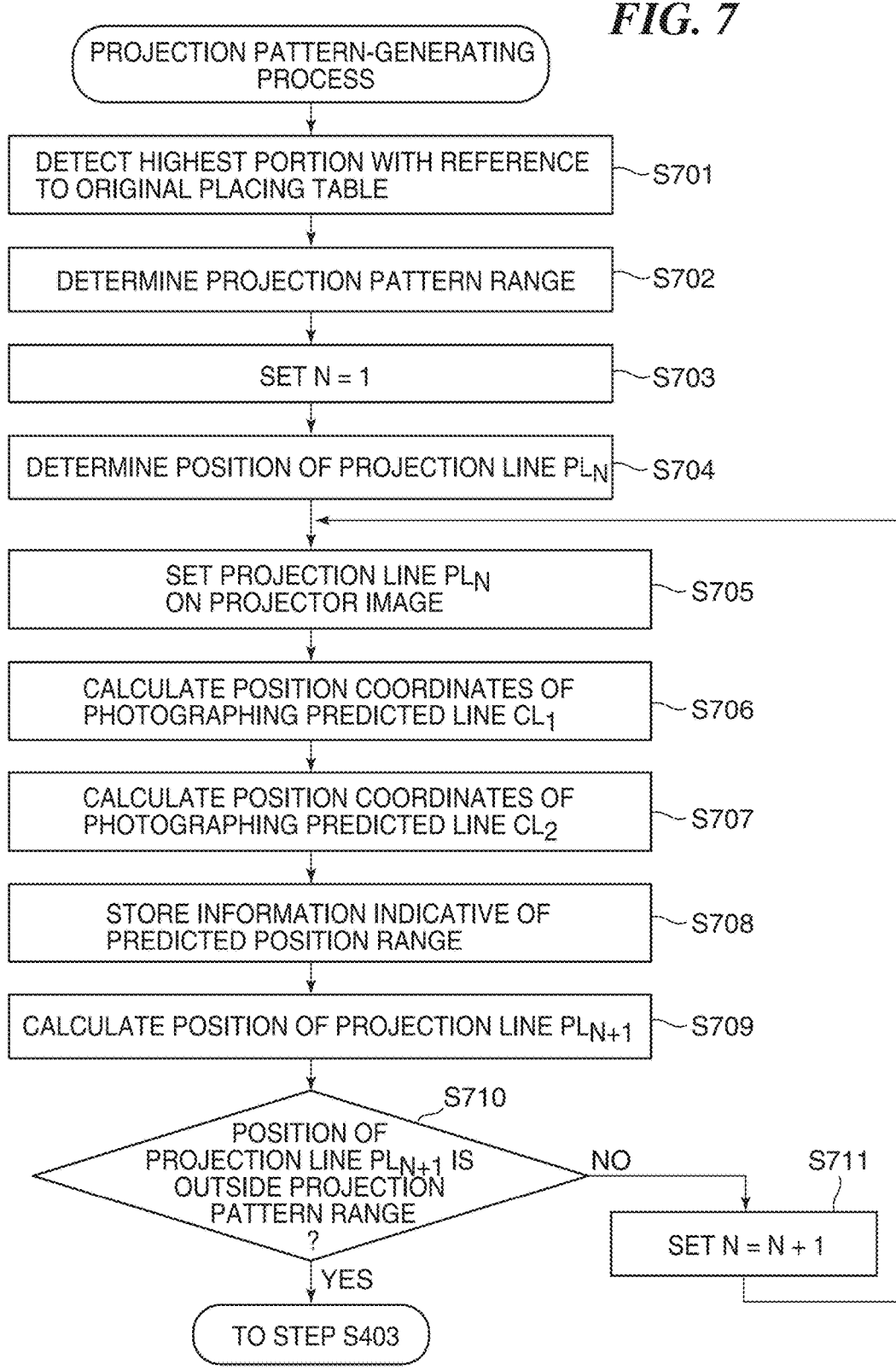
FIG. 7 is a flowchart of a projection pattern-generating process performed in a step in FIG. 4.

FIG. 7 is a flowchart of the projection pattern-generating process performed in the step S402 in FIG. 4.

Figure 6H:
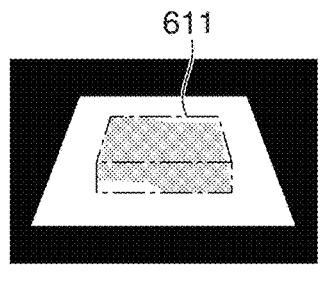
Figure 8A:
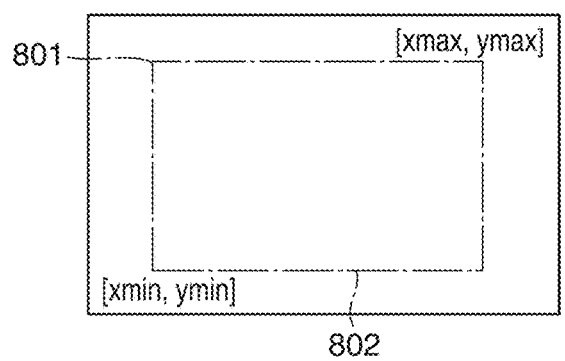
Figure 8B:
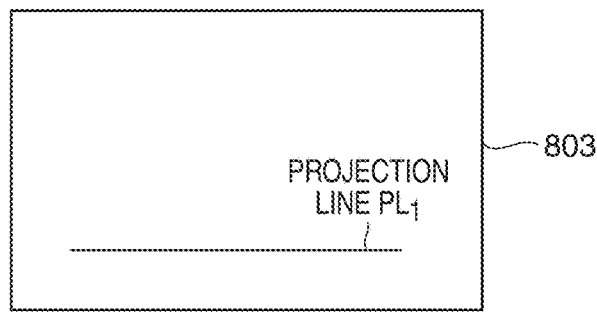

Referring to FIG. 7, first, the CPU 201 detects a portion of the original 108, which is highest, with reference to the original placing table 104 (step S701). More specifically, the CPU 201 extracts the maximum value Zmax of the Z components of the distance distribution information 610 with reference to the original placing table 104. Then, the CPU 201 determines a range 801 of a projection pattern, shown in FIG. 8A, which is to be projected on the original 108 (step S702). In the step S702, for example, the CPU 201 derives a circumscribed rectangular region 611 of the original placing table 104, as shown in FIG. 6H, from the distance distribution information 610, and determines the range 801 of the projection pattern based on coordinates calculated by performing projection transformation on the coordinates of the circumscribed rectangular region 611. Then, the CPU 201 sets a setting value N indicative of a sequence number of the projection line to "1" which indicates a first projection line (step S703), and determines the position of the first projection line $PL_N$ (N=1 in this step) in the range 801 (step S704). In the step S704, the CPU 201 determines a position having an offset set in advance from one of sides forming the range 801, e.g. a lower side 802, as the position of the projection line $PL_N$ (N=1 in this step). Then, the CPU 201 sets the projection line $PL_N$ (N=1 in the first loop) on a projector image 803 including the projection pattern, based on the determined position, as shown in FIG. 8B (step S705). Here, when the projection line $PL_N$ is projected on the original 108, the projection line $PL_N$ is photographed by the camera unit 103 at a height of the original 108 with reference to the original placing table 104, i.e. at a position corresponding to the value of the Z component of the distance distribution information 610. That is, the position of the projection line $PL_N$ photographed by the camera unit 103 depends on the value of the Z component of the distance distribution information 610. In accordance with this, in steps S706 and S707, described hereinafter, the CPU 201 calculates a predicted position range of the position where the projection line $PL_N$ is to be photographed by the camera unit 103. More specifically, the CPU 201 calculates position coordinates of a photographing predicted line $CL_1$ indicating the projection line $PL_N$ to be photographed by the camera unit 103 when the projection line $PL_N$ is projected to a position corresponding to the minimum value Zmin of the Z component of the distance distribution information 610 (step S706). Calculation of the position coordinates of the photographing predicted line $CL_1$ in the step S706 is performed in the following manner:

When inverse projection transformation is performed on the internal parameter of the projector 107, the following equation (7) is derived, and the following equations (8) and (9) are derived from the equation (7):

$$[X_p/Z_p, Y_p/Z_p, 1]^T = [a, b, 1]^T = A_p^{-1}[x_p, y_p, 1]^T \quad (7)$$

$$X_p = aZ_p \quad (8)$$

$$Y_p = bZ_p \quad (9)$$

Further, by using the equations (8), (9), and (5), there is derived the following equation (10):

$$[X, Y, Z]^T = [R_p^{-1} | -R_p^{-1} t_p][aZ_p, bZ_p, Z_p, 1]^T \quad (10)$$

A value of $Z_p$ of the projector coordinate system and three-dimensional coordinates of the Cartesian coordinate system on the plane of the original placing table 104, i.e. on which Z=0 is obtained, are calculated using the equations (7) to (10). When the calculated three-dimensional coordinates of the Cartesian coordinate system are transformed to those of the camera coordinate system by using the equations (1) and (3), the position coordinates of the photographing predicted line $CL_1$ are calculated.

Figure 8C:
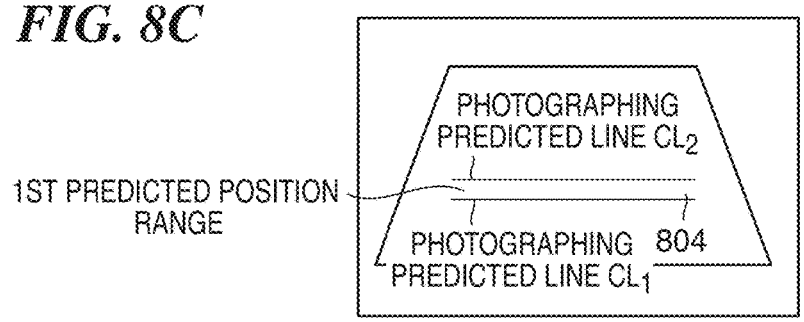

Then, the CPU 201 calculates the position coordinates of a photographing predicted line $CL_2$ indicating the projection line $PL_N$ to be photographed by the camera unit 103 when the projection line $PL_N$ is projected to a position corresponding to the maximum value Zmax of the Z component of the distance distribution information 610 (step S707). In the step S707, the CPU 201 calculates three-dimensional coordinates of the Cartesian coordinate system, on which Z=Zmax holds, by using the equation (10), and transforms the calculated three-dimensional coordinates of the Cartesian coordinate system into those of the camera coordinate system by using the equations (1) and (3) to thereby calculate the position coordinates of the photographing predicted line $CL_2$. Then, as shown in FIG. 8C, the CPU 201 derives a predicted position range 804 (a first predicted position range is illustrated in FIG. 8C) surrounded by the photographing predicted lines $CL_2$ and $CL_2$. Then, the CPU 201 stores information indicative of the predicted position range 804 in the RAM 202 in association with the projection line $PL_N$ (step S708). Then, the CPU 201 calculates the position of a projection line $PL_{N+1}$ such that it does not overlap the predicted position range 804 (step S709). Calculation of the position of the projection line $PL_{N+1}$ is performed in the following manner:

When inverse projection transformation is performed on the internal parameter of the camera, there is derived the following equation (11), and from the equation (11), there are derived the following equations (12) and (13):

$$[X_c/Z_c, Y_c/Z_c, 1]^T = [e, f, 1]^T = A_c^{-1}[x_c, Y_c, 1]^T \quad (11)$$

$$X_c = eZ_c \quad (12)$$

$$Y_c = fZ_c \quad (13)$$

By using the equations (12), (13), and (2), there is derived the following equation (14):

$$[X, Y, Z]^T = [R_c^{-1} | -R_c^{-1} t_c][eZ_c, fZ_c, Z_c, 1]^T \quad (14)$$

The CPU 201 calculates the position of a photographing predicted line $CL_3$ such that it does not overlap the predicted position range 804. Further, the CPU 201 calculates the projection line $PL_{N+1}$ to be projected on the coordinates of the photographing predicted line $CL_3$ on the plane on which Z=0 holds, by performing transformation on the photographing predicted line $CL_3$ by using the equations (11), (14), (4), and (5) in the mentioned order. Then, the CPU 201 determines whether or not the projection line $PL_{N+1}$ is outside the range 801 (step S710).

Figure 8D:
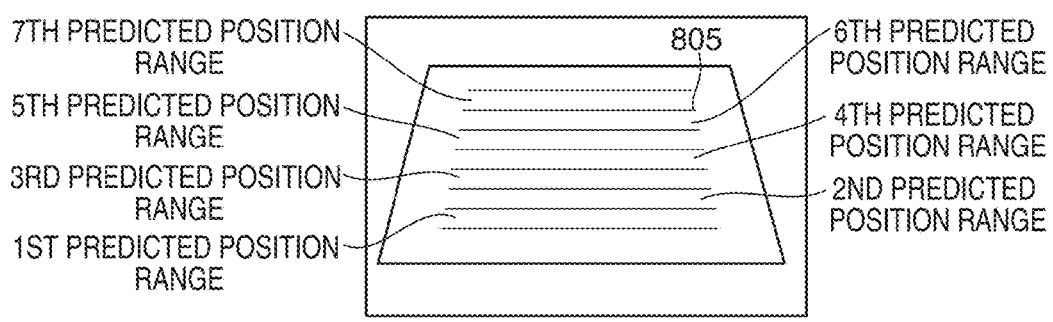

If it is determined in the step S710 that the projection line $PL_{N+1}$ is outside the range 801, the CPU 201 proceeds to the step S403. On the other hand, if it is determined in the step S710 that the projection line $PL_{N+1}$ is within the range 801, the CPU 201 determines the position of the projection line $PL_{N+1}$ based on the calculated position. After that, the CPU 201 adds 1 to the variable N stored in the RAM 202 (step S711), and executes the step S705 et seq. for the projection line $PL_{N+1}$. According to the above-described process, even when the shape information and position information of an original have not been stored in advance, the position of each projection line and space intervals between the projection lines are determined, whereby a projection pattern 805 including a plurality of projection lines, e.g. seven projection lines, as shown in FIG. 8D, is generated. Therefore, in the present embodiment, a storage area for storing the shape information and position information of an original, and a setting screen for setting the shape information and position information of the original need not be displayed on the LCD touch panel 208.

FIG. 9 is a flowchart of the projection line detection process performed in the step S403 in FIG. 4.

Figure 6I:
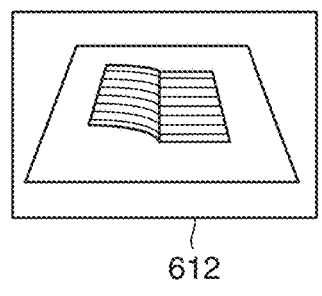
Figure 6J:
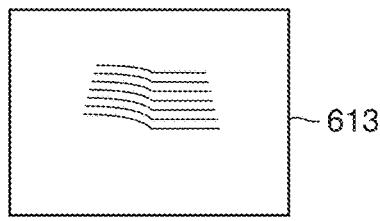

Referring to FIG. 9, first, the CPU 201 causes the projector 107 to project the projection pattern 805 generated in the step S402 onto the original 108 (step S901). The CPU 201 causes the camera unit 103 to photograph the original 108 on which the projection pattern 805 is projected to thereby generate a photographed image 612 shown in FIG. 6I, and stores the photographed image 612 in the RAM 203. Then, the CPU 201 generates a difference image 613 shown in FIG. 6J based on differences between the luminance image 601 generated in the step S401 and the photographed image 612 (step S902). The difference image 613 includes only components of the projection lines. Then, the CPU 201 detects the projection lines from the difference image 613 (step S903), identifies the projection line number set by the setting value N of each of the projection lines detected in the step S903 (step S904), and executes the step S404 in FIG. 4.

According to the above-described processes in FIGS. 4, 5, 7, and 9, the distance distribution information 610 for identifying the shape, size, and position of the original 108 is generated based on the measured distance, and the projection pattern 805 is generated based on the generated distance distribution information 610. This makes it possible to positively generate the projection pattern 805 suitable for the original 108 without storing the information on the shape, size, and position of the original 108 in advance.

Further, in the above-described processes in FIGS. 4, 5, 7, and 9, the position of each projection line and the space intervals between the projection lines are determined based on the distance distribution information 610. This makes it possible to generate the projection pattern having a position of each projection line and space intervals between the projection lines, which are suitable for the original 108.

Although the description is given of the present invention based on the embodiment, the present invention is not limitedly applied to the above-described embodiment.

For example, in the projection pattern, not only the position of each projection line and the space intervals between the projection lines, but also the direction of each projection line may be determined.

Figure 10A:
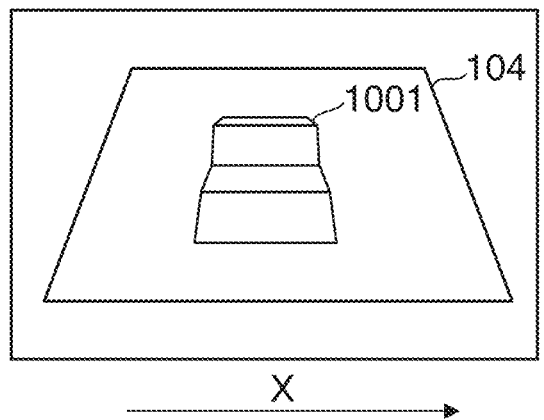
Figure 10B:
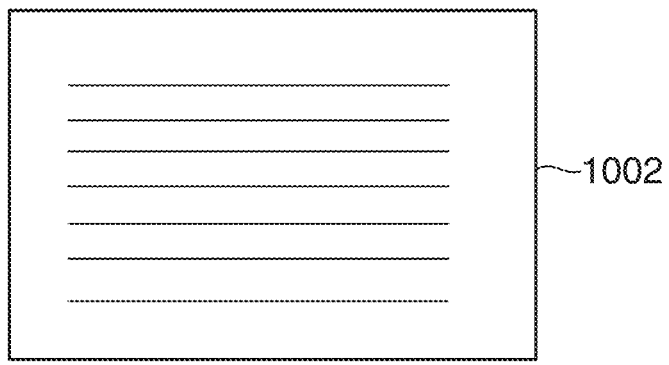
Figure 10C:
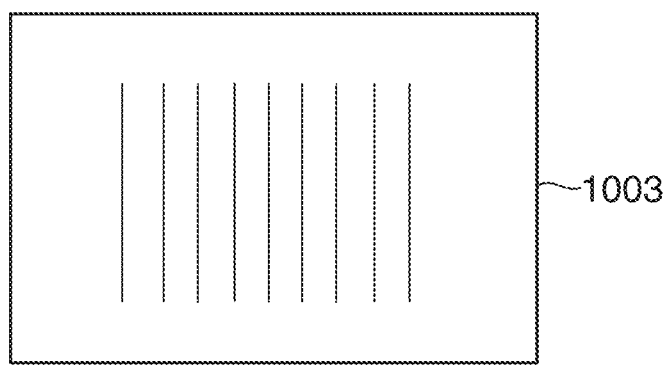

It is sometimes impossible to accurately measure the bending of a to-be-read object when a projection pattern is used in which only the space intervals and positions of the projection lines are adjusted as in the above-described embodiment. To measure the bending of a to-be-read object, it is necessary to cause each projection line of the projection pattern to cross the bending of the to-be-read object. For this reason, for example, in a case where the bending of an original 1001 is along an X direction of the original placing table 104 as shown in FIG. 10A, it is more preferable to use, as the projection pattern, a projection pattern 1003, shown in FIG. 10C, including projection lines substantially orthogonal to the bending of the original 1001 than a projection pattern 1002, shown in FIG. 10B, including projection lines substantially parallel to the bending of the original 1001. In short, to accurately measure the bending of a to-be-read object, it is necessary to determine the direction of the projection lines according to the bending of the to-be-read object.

To cope with this, in the present embodiment, the direction of each projection line may be determined based on the distance distribution information 610, as described hereafter.

Figure 11:
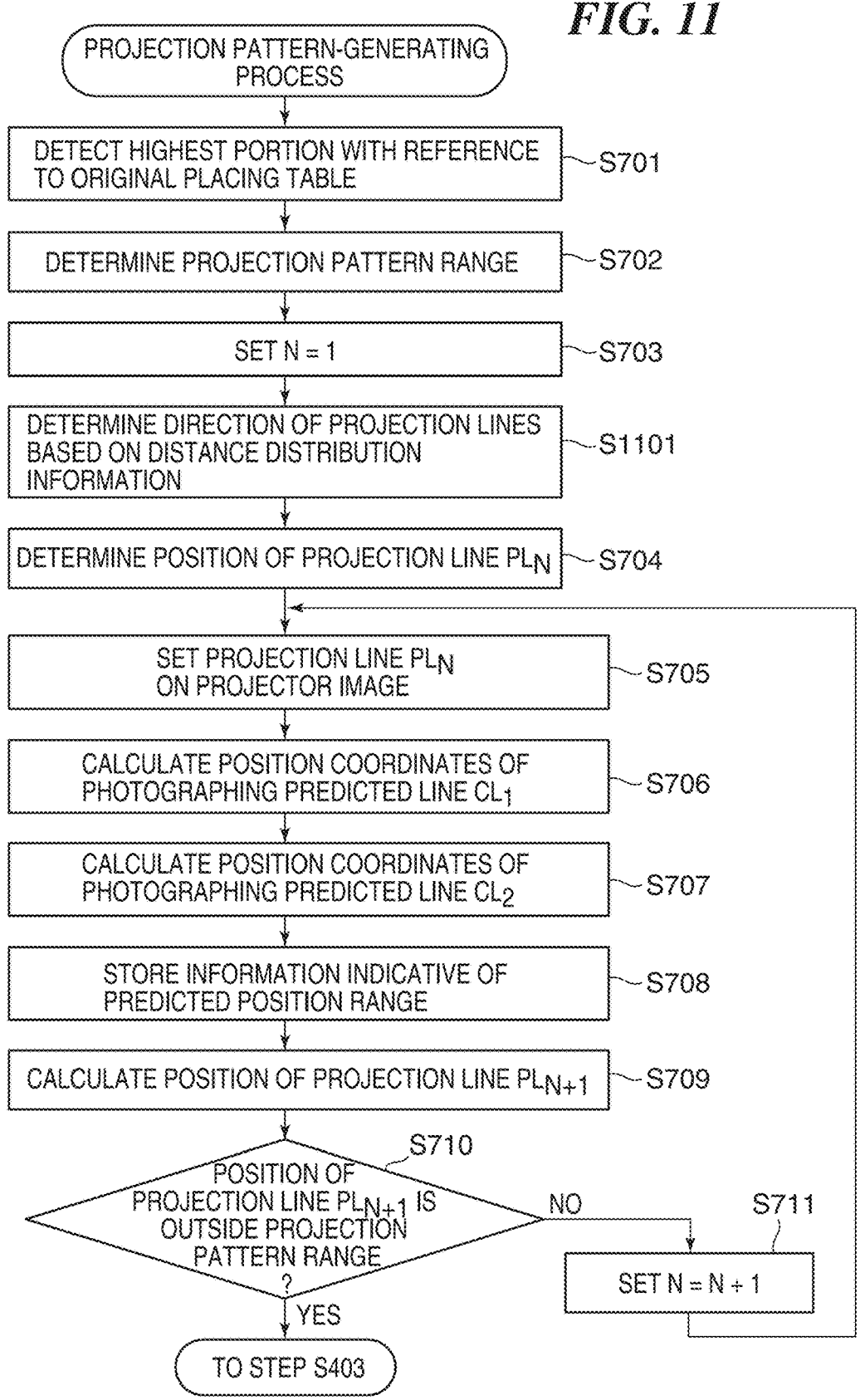
FIG. 11 is a flowchart of a first variation of the projection pattern-generating process in FIG. 7.

FIG. 11 is a flowchart of a first variation of the projection pattern-generating process in FIG. 7.

Figure 12A:
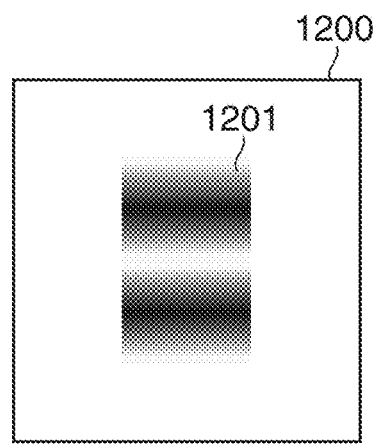
Figure 12B:
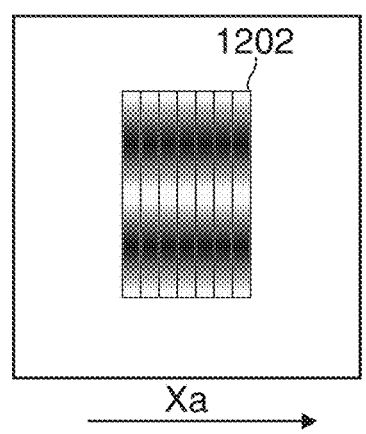
Figure 12C:
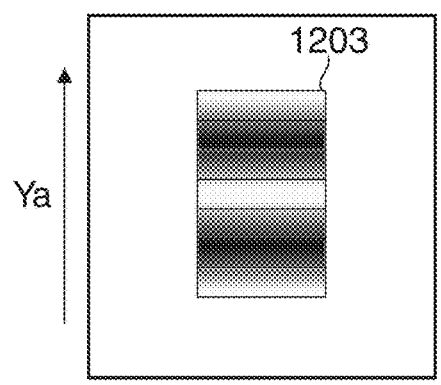

Referring to FIG. 11, first, the CPU 201 executes the same processing as the steps S701 to S703 in FIG. 7. Then, the CPU 201 determines the direction of each projection line of the projection pattern based on the distance distribution information 610 (step S1101). For example, in a case where the original 1001 is photographed in the step S401, and a distance image 1200, shown in FIG. 12A, is generated, the CPU 201 generates dividing lines 1202 shown in FIG. 12B and dividing lines 1203 shown in FIG. 12C, which divide an original area 1201 in the distance image 1200, corresponding to the original 1001. The dividing lines 1202 divide the original area 1201 into a plurality of divided areas along an $X_a$ direction of the distance image 1200, as shown in FIG. 12B. The dividing lines 1203 divide the original area 1201 into a plurality of divided areas along a $Y_a$ direction of the distance image 1200, as shown in FIG. 12C. In general, in the distance distribution information, a difference in distance information between two portions adjacent to each other in a direction orthogonal to the bending is large at a bent portion of a to-be-read object. For this reason, in the distance distribution information generated based on the distance image 1200 in the step S401, the CPU 201 calculates a difference in distance information in a direction along the dividing lines 1202 based on a variance value of the distance information corresponding to the dividing lines 1202, and calculates a difference in distance information in a direction along the dividing lines 1203 based on a variance value of the distance information corresponding to the dividing lines 1203. The CPU 201 compares the calculated differences, and decides a direction along the dividing lines along which a larger difference is calculated, as the direction of each projection line. Then, the CPU 201 executes the step S704 et seq. in FIG. 7.

In the above-described process in FIG. 11, with respect to the plurality of projection lines, a direction of arrangement of two adjacent portions having a large difference in distance information, out of portions where the projection lines cross the bending, is decided as the direction of the projection lines. Here, in the light sectioning method, it is preferable to cause the bending and each projection line to cross each other so as to accurately measure the bending of the original 1001. In the original 1001, in the case of the direction crossing the bending, a difference in distance information between two adjacent portions is large at the bent portion. In accordance with this, in the present embodiment, a direction of arrangement of two adjacent portions having a larger difference in distance information is decided as the direction of the projection lines, and hence it is possible to positively cause each projection line to cross the bending of a to-be-read object. As a result, it is possible to accurately measure the bending of the to-be-read object in the light sectioning method.

Although in the above-described process in FIG. 11, the description is given of the case where the direction of each projection line is set to a direction along one of the $X_a$ and $Y_a$ directions of the distance image 1200, the direction of each projection line is not limited to a direction along one of the $X_a$ and $Y_a$ directions of the distance image 1200. For example, not only the dividing lines along the $X_a$ and $Y_a$ directions of the distance image 1200, but dividing lines oblique to the $X_a$ and $Y_a$ directions of the distance image 1200 may be generated, and a difference in distance information corresponding to the oblique dividing lines may be also calculated, whereby a direction along dividing lines having the largest difference may be determined as the direction of each projection line.

Further, in the present embodiment, the projection pattern may be generated based on luminance information.

Figure 13:
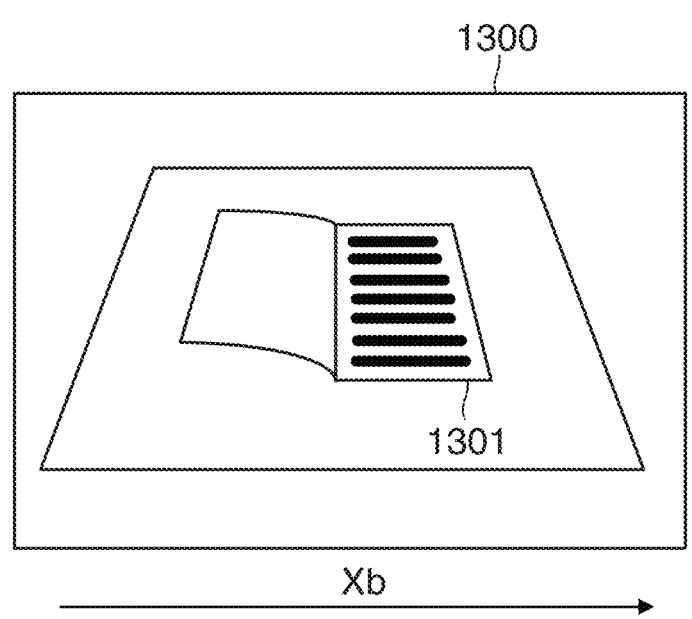
FIG. 13 is a diagram useful in explaining a problem to be solved by a second variation of the embodiment.

Here, there is a case where it is impossible to accurately measure the bending of an original using a projection pattern generated based only on the distance distribution information. For example, in a case where on an original 1301 having e.g. ruled lines extending substantially parallel to the $X_b$ direction of a luminance image 1300, as shown in FIG. 13, a projection pattern including projection lines in a direction along the ruled lines is projected, not only the projection pattern, but also e.g. information associated with the ruled lines of the original 1301 is sometimes detected e.g. due to an influence of variation in illumination. This makes it impossible to accurately measure the bending of the original 1301.

To cope with this, in the present embodiment, the direction of each projection line may be determined based on luminance distribution information, as described hereafter.

Figure 14:
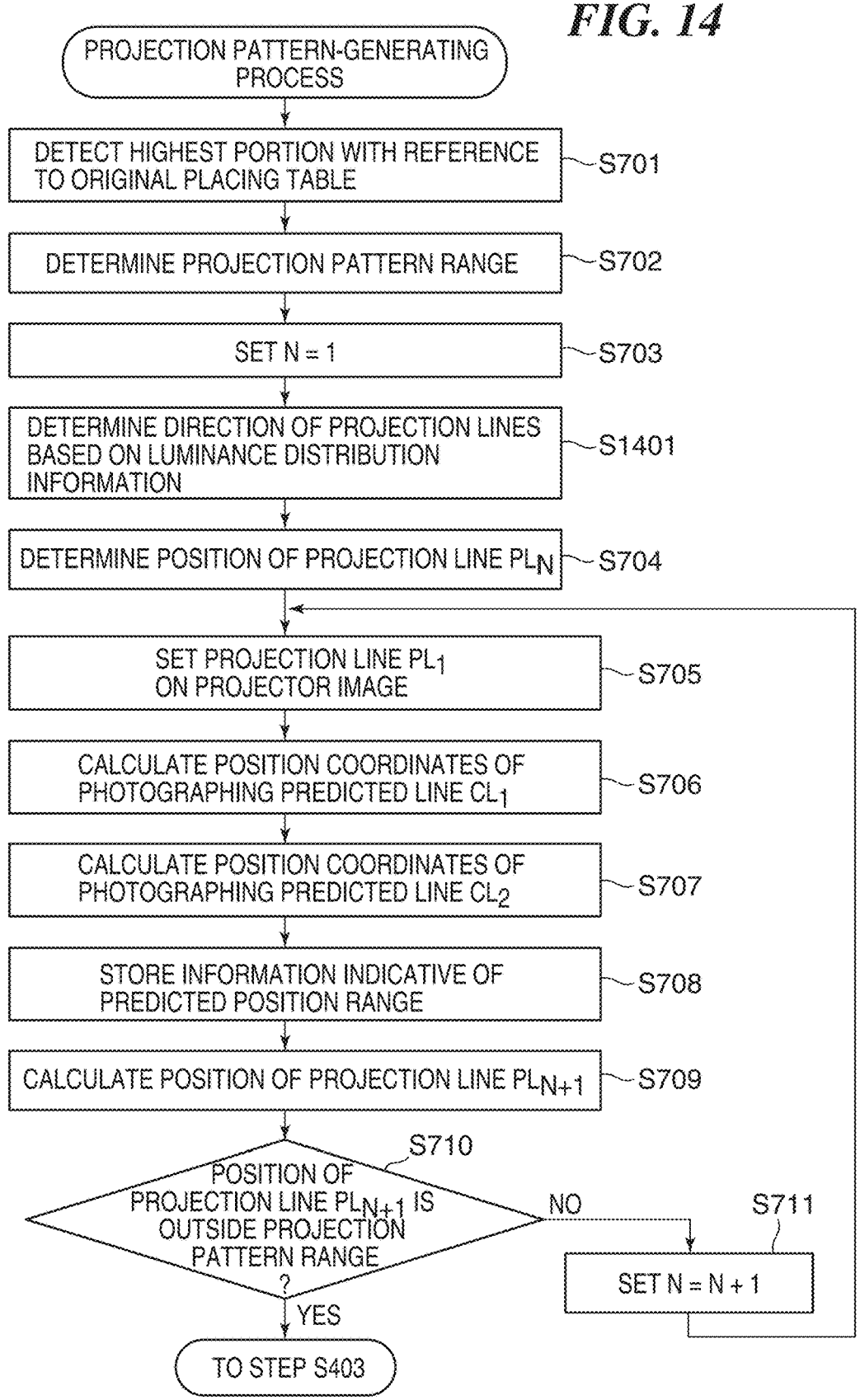
FIG. 14 is a flowchart of a second variation of the projection pattern-generating process in FIG. 7.

FIG. 14 is a flowchart of a second variation of the projection pattern-generating process in FIG. 7.

Referring to FIG. 14, first, the CPU 201 executes the same processing as the steps S701 to S703 in FIG. 7. Then, the CPU 201 measures luminance information of portions forming the luminance image 601 from the luminance image 601 photographed in the step S401 (operation of a luminance measurement unit), and generates luminance distribution information including the measured luminance information (operation of a luminance distribution information-generating unit). Further, the CPU 201 calculates a luminance gradient indicative of differences in luminance in the generated luminance distribution information. Assuming that coordinates of the luminance image are expressed by (u, v), and a luminance of the coordinates of the luminance image is expressed by I(u, v), the luminance gradient m and a luminance gradient direction θ are calculated respectively by the following equations (15) and (16):

$$m = \sqrt{(I(u+1, v) - I(u-1, v))^2 + (I(u, v+1) - I(u, v-1))^2} \quad (15)$$

$$\theta = \arctan \frac{I(u+1, v) - I(u-1, v)}{I(u, v+1) - I(u, v-1)} \quad (16)$$

The CPU 201 determines the luminance gradient direction θ having the largest luminance gradient as the direction of the projection lines based on a result of the calculation (step S1401). Then, the CPU 201 executes the step S704 et seq. in FIG. 7.

In the above-described process in FIG. 14, the direction of the projection lines is determined based on the luminance distribution information, and hence it is possible to generate a projection pattern suitable for the pattern of an original.

In the present embodiment, the distance image sensor unit 109 and the camera unit 103 each are oriented to the reading surface of a to-be-read object, and hence it is possible to positively measure the distance to the reading surface of the to-be-read object and the luminance of the reading surface of the to-be-read object.

In the above-described embodiment, by combining the distance distribution information and the luminance distribution information, the direction of projection lines may be determined based on the distance distribution information and the luminance distribution information. This makes it possible to generate a projection pattern suitable not only for the pattern of an original, but also for the shape, size, and position of the original.

In the above-described embodiment, in a case where the distance distribution information and the luminance distribution information are used in combination, a difference in distance information, a luminance gradient, or the like may be weighted.

In the present embodiment, as the distance distribution information 610, the distance distribution information subjected to correction of a measurement error of the camera scanner 101 may be used.

Further, although in the present embodiment, the projection lines $PL_N$ and $PL_{N+1}$, and the photographing predicted lines $CL_1$, $CL_2$, and $CL_3$ are described as straight lines, the projection lines and the photographing predicted lines are not limited to the straight lines, but curved lines may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-010603 filed Jan. 22, 2016, which is hereby incorporated by reference herein in its entirety.

What is claimed is:

1. A measurement apparatus that projects a projection pattern formed by a plurality of projection lines on a to-be-read object to thereby measure bending of the to-be-read object, comprising:
   a distance measurement sensor configured to measure a distance to the to-be-read object;
   a luminance measurement unit, including a camera, configured to measure a luminance of the to-be-read object; and
   a processor configured to execute instructions stored in a memory to provide, at least:
      a luminance distribution information generating unit configured to generate luminance distribution information of the to-be-read object for identifying a pattern of the to-be-read object, based on the measured luminance;
      a distance distribution information-generating unit configured to generate distance distribution information of the to-be-read object for identifying a shape, a size, and a position of the to-be-read object, based on the measured distance; and
      a projection pattern-generating unit configured to generate the projection pattern and determine a direction of the plurality of projection lines based on the generated distance distribution information and the generated luminance distribution information of the to-be-read object.

2. The measurement apparatus according to claim 1, wherein the projection pattern-generating unit is further configured to determine a direction of the projection lines based on the distance distribution information of the to-be-read object.

3. The measurement apparatus according to claim 1, wherein the distance measurement sensor is oriented to a reading surface of the to-be-read object.

4. The measurement apparatus according to claim 1, wherein the luminance measurement unit is oriented to the reading surface of the to-be-read object.

5. A method of controlling a measurement apparatus that projects a projection pattern formed by a plurality of projection lines on a to-be-read object to thereby measure bending of the to-be-read object, the method comprising:
   measuring a distance to the to-be-read object;
   measuring a luminance of the to-be-read object;
   generating luminance distribution information of the to-be-read object for identifying a pattern of the to-be-read object, based on the measured luminance;
   generating distance distribution information of the to-be-read object for identifying a shape, a size, and a position of the to-be-read object, based on the measured distance; and
   generating the projection pattern and determining a direction of the plurality of projection lines based on the generated distance distribution information and the generated luminance distribution information of the to-be-read object.

6. A non-transitory computer-readable storage medium storing a computer-executable program for executing a method of controlling a measurement apparatus that projects a projection pattern formed by a plurality of projection lines on a to-be-read object to thereby measure bending of the to-be-read object, wherein the method comprises:
   measuring a distance to the to-be-read object;
   measuring a luminance of the to-be-read object;
   generating luminance distribution information of the to-be-read object for identifying a pattern of the to-be-read object, based on the measured luminance;
   generating distance distribution information of the to-be-read object for identifying a shape, a size, and a position of the to-be-read object, based on the measured distance; and
   generating the projection pattern and determining a direction of the plurality of projection lines based on the generated distance distribution information and the generated luminance distribution information of the to-be-read object.

7. The measurement apparatus according to claim 1, wherein the projection pattern-generating unit is further configured to generate the projection pattern by determining the position of each projection line of the plurality of projection lines and space intervals of the plurality of projection lines based on the generated distance distribution information of the to-be-read object.

* * * * *